(12) United States Patent
Heggdal

(10) Patent No.: US 8,858,121 B2
(45) Date of Patent: Oct. 14, 2014

(54) STRAPPING MACHINE

(75) Inventor: Ole A. Heggdal, Finstadjordet (NO)

(73) Assignee: Aker Subsea AS, Lysaker (NO)

( * ) Notice: Subject to any disclaimer, the term of this patent is extended or adjusted under 35 U.S.C. 154(b) by 0 days.

(21) Appl. No.: 13/635,202

(22) PCT Filed: Mar. 15, 2011

(86) PCT No.: PCT/NO2011/000083
§ 371 (c)(1), (2), (4) Date: Sep. 14, 2012

(87) PCT Pub. No.: WO2011/115500
PCT Pub. Date: Sep. 22, 2011

(65) Prior Publication Data
US 2013/0011200 A1    Jan. 10, 2013

(30) Foreign Application Priority Data
Mar. 17, 2010    (NO) .................................... 20100387

(51) Int. Cl.
*F16L 1/12*    (2006.01)
*F16L 1/20*    (2006.01)
*F16L 9/19*    (2006.01)

(52) U.S. Cl.
CPC .. *F16L 9/20* (2013.01); *F16L 1/202* (2013.01)
USPC ...................................................... 405/169

(58) Field of Classification Search
USPC .................. 405/166, 169, 178; 226/172, 189; 242/615.1, 615.2
See application file for complete search history.

(56) References Cited

U.S. PATENT DOCUMENTS

| | | | |
|---|---|---|---|
| 5,553,666 A | 9/1996 | Hartman | |
| 6,098,913 A * | 8/2000 | Demore | 242/447.3 |
| 2003/0103811 A1 | 6/2003 | Grimseth | |
| 2006/0243471 A1 | 11/2006 | Karlsen et al. | |

FOREIGN PATENT DOCUMENTS

| | | | |
|---|---|---|---|
| NO | 323381 B1 | 4/2007 | |
| WO | WO 2007/105962 A1 | 9/2007 | |

\* cited by examiner

*Primary Examiner* — Tara M. Pinnock
*Assistant Examiner* — Patrick Lambe
(74) *Attorney, Agent, or Firm* — Birch, Stewart, Kolasch & Birch, LLP

(57) ABSTRACT

An arrangement on board a vessel to be able to strap at least one cable to a pipeline during continuous and contemporary deployment of the strapped pipe bundle into the sea is shown. The arrangement includes at least a strapping machine which is arranged to be moved forward together with the cable and pipeline in order to perform a strapping operation in concert with the forward advancement thereof. The strapping machine is also moveable rearwards relative to the cable and pipeline for the repositioning to the next strapping operation such that the application of a strap or straps takes place intermittently under the continuous deployment of the pipe bundle. Means for continuous motorized advancement of the respective pipes and cables towards the strapping machine and further into the sea is also arranged.

22 Claims, 7 Drawing Sheets

STRAPPING MACHINE

The present invention relates to an arrangement on board a vessel to be able to strap at least one cable to a normally bigger pipeline during continuous and contemporary deployment of the strapped pipe bundle (piggyback) into the sea, and an associated method of the strapping.

Figure 1:
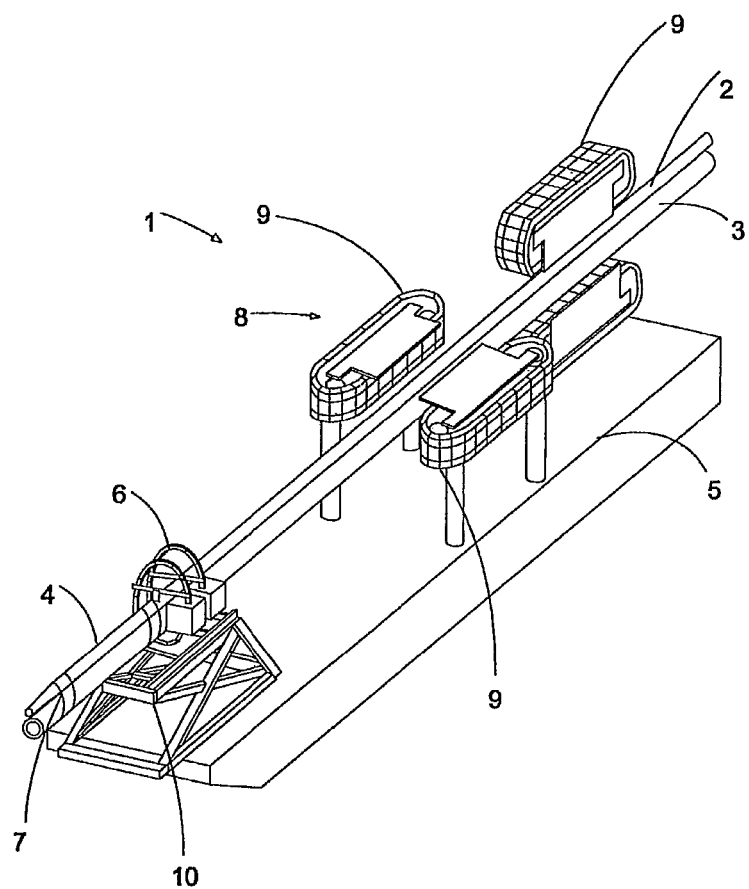

It is commonly known to strap a smaller pipe to a bigger pipe, for example as discussed in the description of the prior art in US 2003/0103811 A1 (Grimseth) and illustrated in FIG. 1. This solution shows a smaller pipe 11 for hydrate inhibition resting on a saddle 12 which in turn rests on a bigger umbilical and is strapped to each other by the band 17.

Figure 2:
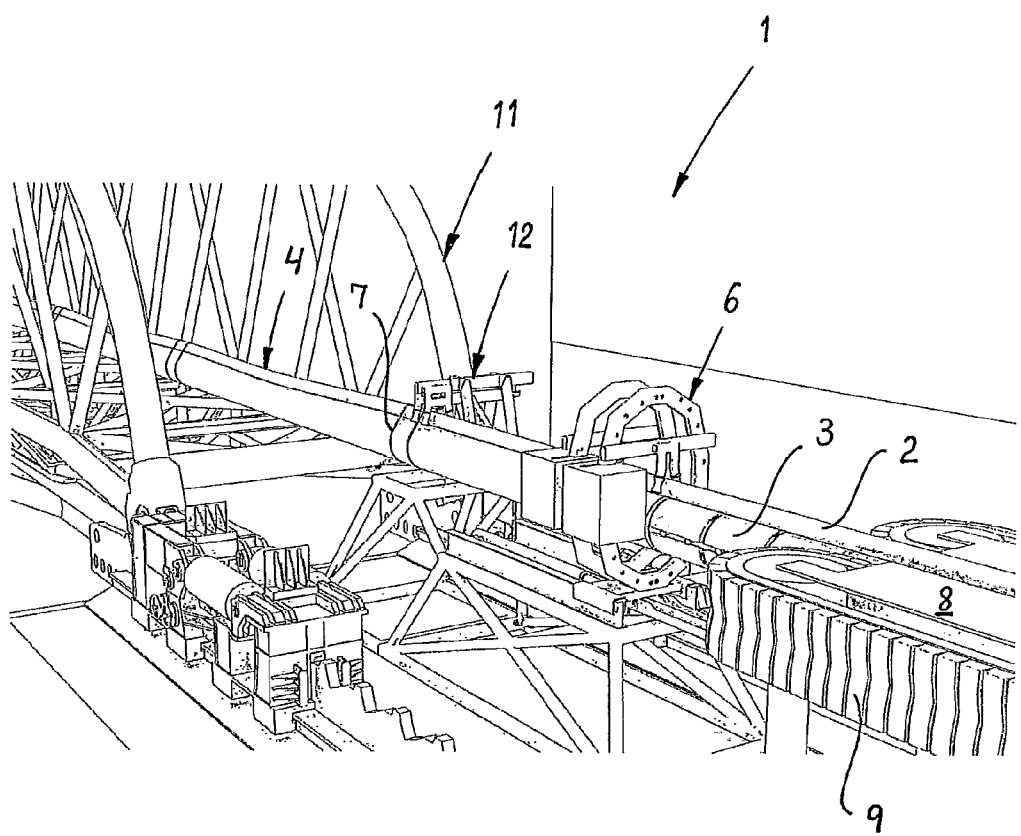

A different document showing strapping of a cable to a larger pipe is NO 323 381 (Statoil/Nexans). Here an electric high voltage cable strapped to a flowline is shown. The cable is a DEH cable (Direct Electric Heating). Elongate saddle elements put together in the longitudinal direction are used. In addition to act as a saddle against the larger pipe, the saddle elements also enclose the smaller pipe in order to create a continuous, protecting enclosure that the DEH cable is resting in. At intervals the straps are guided around the pipes and the protection such as illustrated in FIG. 2. The entire laying process is interrupted for each strapping operation, which is very time and labour consuming, as it simultaneously provides seriously reduced laying speed. How this appears and is done by Grimseth are not known for the applicant.

Another example of the prior art is shown in U.S. Pat. No. 5,553,666.

One object with the present invention has been to provide an arrangement for strapping of at least two pipes that can take place continuously during the pipe laying operation and can take place in a speedy and effective way without much risk to have the laying stopped because of failure with the method or equipment used. One component that takes both extended time and that creates problems with the solution according to NO 323 381, is the saddle elements that the cables are laid into and the protective elements laying above the cable and in combination encloses the cable completely, as mentioned shown in FIG. 2. It is not described in the patent, but probably the saddle elements are manually put onto the bigger pipe before the cable is installed and closed by the overlaying protection before the strapping operation can take place. Clearly it would have been a great improvement to avoid the saddles and the enclosing protection and also be able to depart from all manual work, and in stead be able to perform continuous strapping while the pipeline is deployed into the sea unabated. By such a procedure the deployment speed of the pipeline is determined by other premises than the strapping speed. In this connection saved time is also saved costs of substantial amount.

Another object with the present invention has been to provide the cable with an inherent or integrated protection such that separate protection as described above can be avoided. In spite of such protection, this shall not prevent the cable from being coiled up on a large carousel and in lengths of 20 to 40 km without splices.

It has also been important to prevent problems with damages to the cable during handling thereof and installation. This also includes that any problems or damages happens on the cable when they are strapped to the pipe.

Still another object with the invention has been to prevent that breakages etc due to thermal expansion or contraction occur. And neither any problems with local elevated buckling.

According to the present invention an arrangement of the introductory said kind is provided, which is distinguished in that the arrangement includes at least one strapping machine, which at least one strapping machine is arranged to be moved forward together with the cable and pipeline in order to perform the strapping operation in concert with the forward advancement thereof, and moveable rearwards relative to the cable and pipeline for the repositioning to the next strapping operation such that the application of a strap or straps takes place intermittently under the continuous laying or deployment of the pipe bundle, and means for continuous motorized advancement of the respective pipes and cables towards the strapping machine and further into the sea.

The paragraph above describes the arrangement in the simplest form. By such arrangement the use of separate saddles and individual, encircling protection elements will be completely avoided. The cable is strapped directly onto the pipeline. The cable can also be in simplest form without much protective structures. In the simplest form the cable will also be laying straight and approximately in parallel with the pipeline.

In a preferable embodiment the arrangement includes means for gentle S-forming (snaking) of each cable resting against the bigger pipeline. This is done to take into account possible thermal expansion or contraction in order to avoid rupture damage in the cable. The length of the pipeline can also change due to pressure variations within the pipeline.

In one embodiment the means for gentle S-forming (snaking) of each cable can include a working cylinder acting on rollers engaging the cable, said working cylinder being activated back and forth in amplitude excursions in order to S-form the cable into gentle sinus form.

Normally the means for gentle S-forming (snaking) of each cable will be stationary relative to the vessel and the advancing cable bundle.

Conveniently the strapping machine(s) is (are) arranged on a chassis which in turn is attached to the vessel, which strapping, machine(s) is (are) moveable back and forth along guide rails relative to the chassis.

Each strapping machine includes a strap tensioning means and an associated endless strap track extending circumferentially around the cables and the pipeline and a distance apart therefrom, which strap track is able to guide the strap in orbit around the pipe bundle before the strap tensioning operation is performed.

Preferably the means for continuous motorized advancement of the respective cables and the pipeline towards the strapping machine(s) are in the form of a number of caterpillar tracks acting directly against cable and pipeline surfaces.

According to the present invention also a method to bundle by means of strapping at least one cable string to a pipeline to be deployed continuously into the sea from a pipelay vessel is provided, which method is distinguished in that the larger pipeline and each cable string are fed or advanced in concert and in contact with each other in a direction towards a strapping machine, that the strapping machine at intervals is activated to perform a strapping operation contemporary to that the strapping machine is moved in concert with the pipe bundle, that the strapping machine is re-allocated relative to the pipe bundle for preparation to another strapping operation, and that the cable string at a location near the strapping machine is laterally influenced for creation of gentle excursions (snaking) and remains resting in such gentle sinus configuration subsequent to such strapping when the bundle enters the sea and descends to the seabed.

Preferably the method can be performed in such a way that the interface between the larger pipeline and each cable string is deformed for creation of natural saddle indentations in the strapping area. This further contributes to stabilize the cable string when it is trapped to the main pipeline. This is made possible due to the outer sheath of the pipeline (for example bitumen mastic) and/or the resilient outer sheath of the cable. The rate of deformation is naturally material dependent. If the pipeline is pure steel pipe or has a mantel of concrete, there will not be any deformation in other than the outer sheath of the cable, which is normally made of polyethylene.

Each strapping may takes place at intervals between 2 to 10 meters, preferably about 6 meters.

Said strapping can be performed with two strapping machines where each strap is placed between 50 and 500 mm apart when viewed in the longitudinal direction of the pipe bundle.

Figure 3:
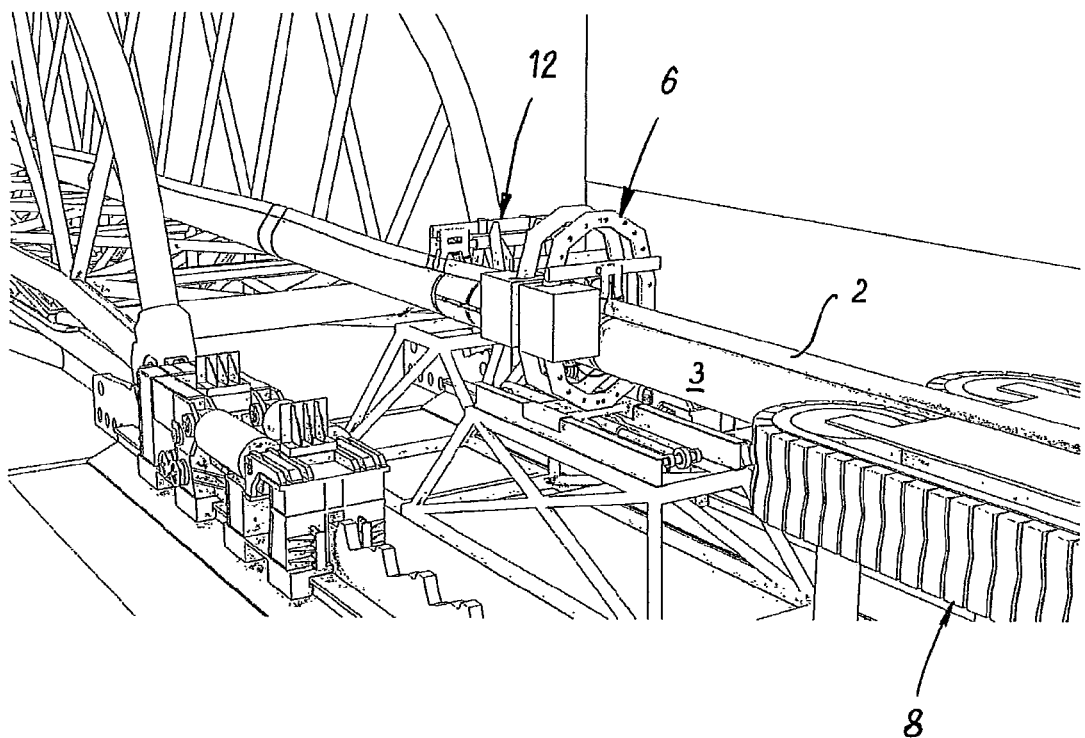
Figure 4:
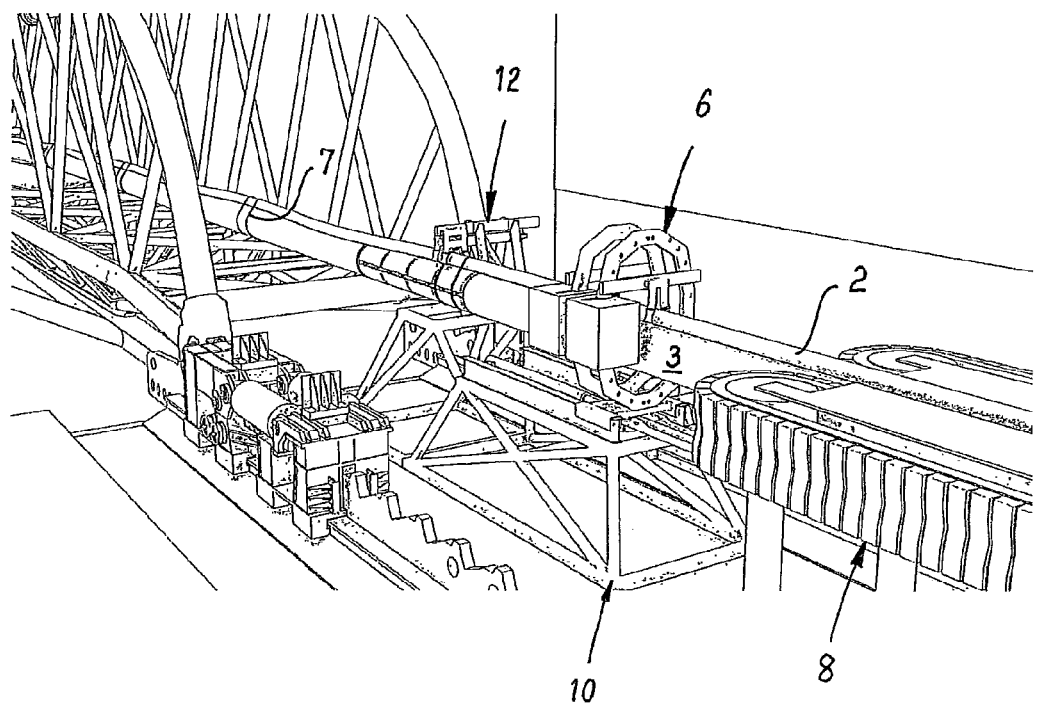
Figure 5:
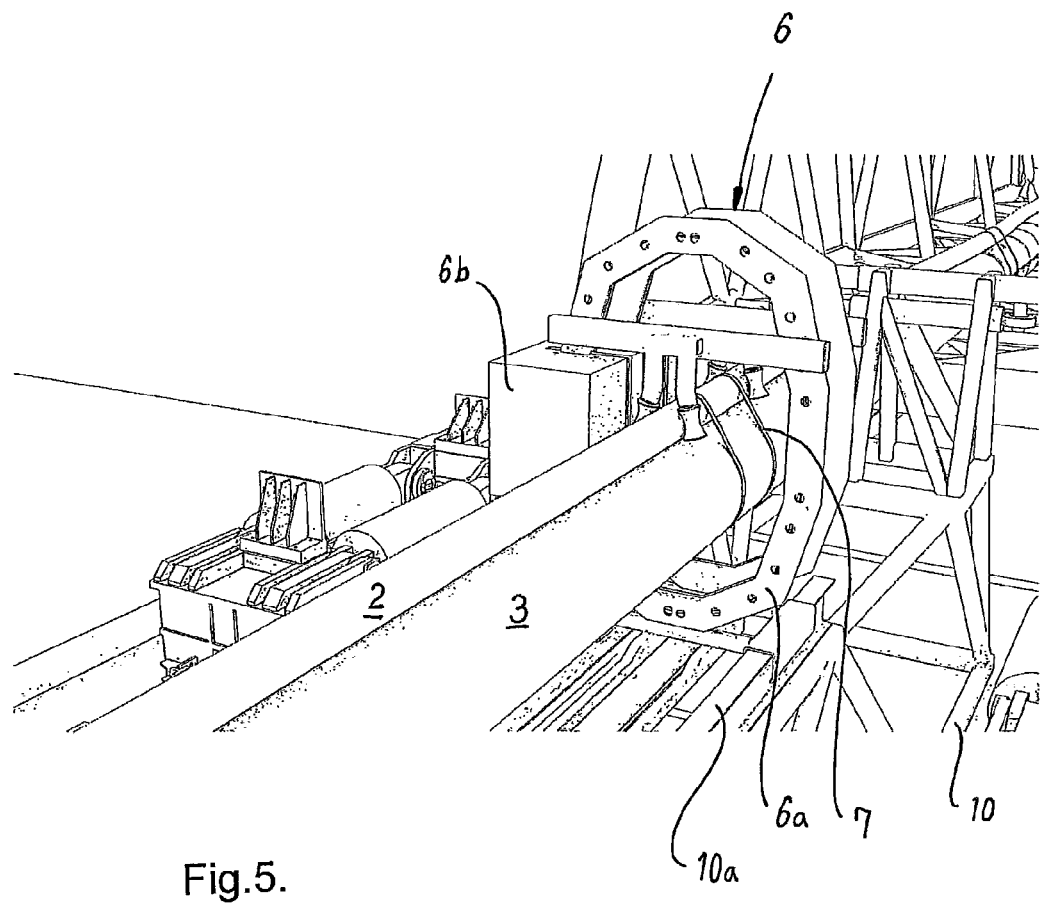
Figure 6:
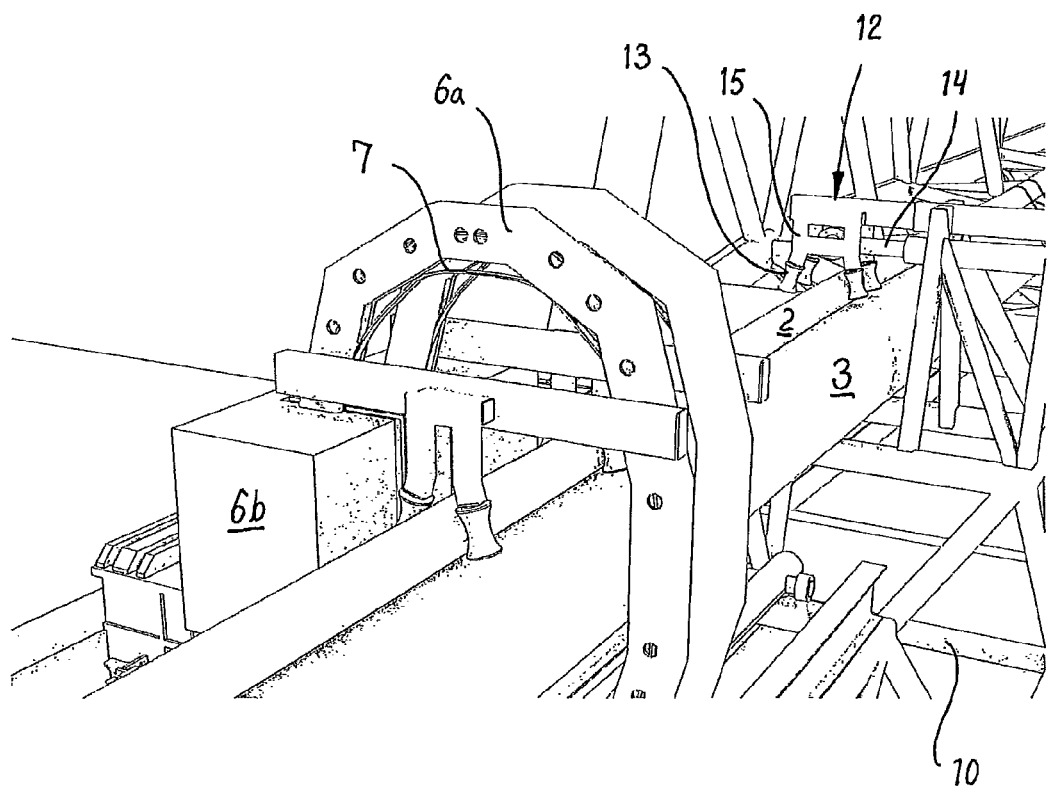
Figure 7:
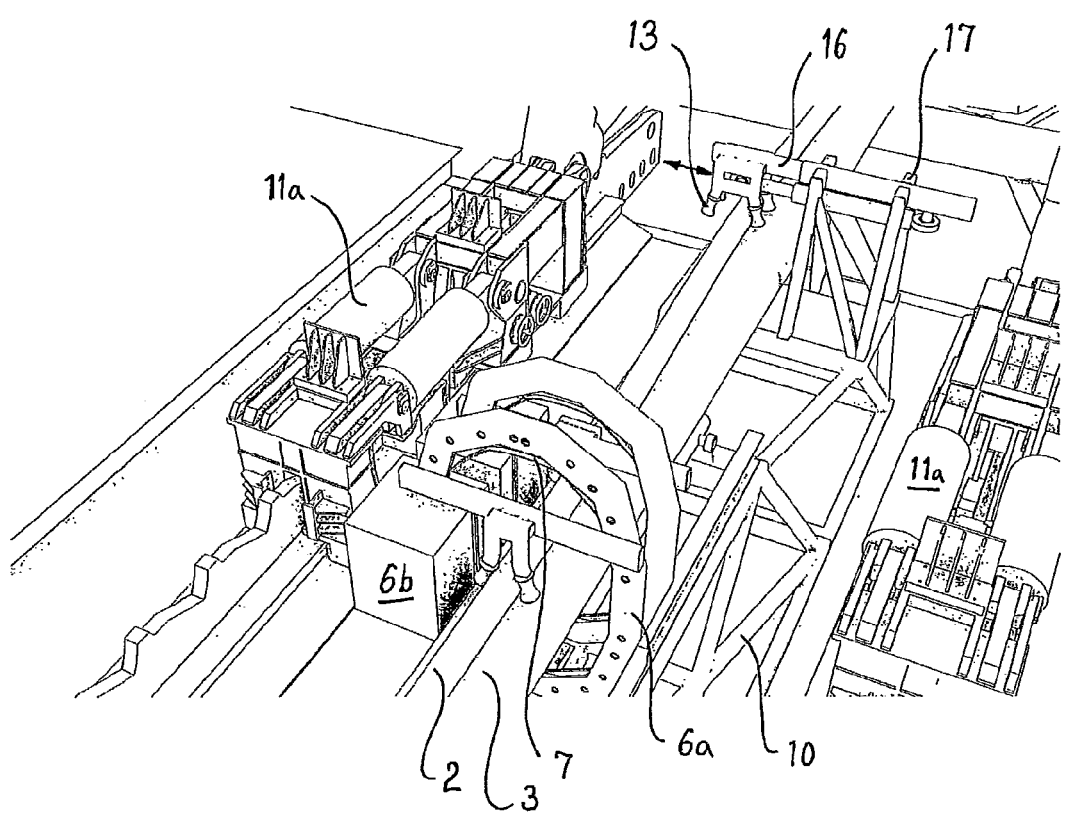

Other and further objects, features and advantages will appear from the following description of preferred embodiments of the invention, which are given for the purpose of description, and given in context with the appended drawings where:

FIG. 1 shows a schematically perspective view of an arrangement according to the invention in its simplest embodiment, FIG. 2 shows a perspective view of an arrangement according to the invention with the addition of a means to provide S-forming, FIG. 3 shows the same as in FIG. 2, but with the strapping machine in a different position, FIG. 4 shows the same as in FIG. 2, but with the strapping machine in still a different position, FIG. 5 shows the strapping machine in closer detail, FIG. 6 shows the same as in FIG. 5, but with the strapping machine in a different position, and FIG. 7 shows the same as in FIG. 2, but with the strapping machine in still a different position.

Reference is now made to the drawings where FIG. 1 shows the entire arrangement 1 according to the invention in its simplest form, which is adapted to strap at least one power cable 2 to a normally larger pipe 3, or pipeline 3. This is supposed to take place during continuous and simultaneous laying or deployment of the strapped pipe bundle 4 into the sea. The arrangement includes several structures that are located on a pipe laying vessel and where only a small deck area 5 of the vessel is shown. In the further description reference is for simplicity reasons made to only one power cable 2, while it is conceivable with several cables, though the normal will be one cable 2 only. It is also conceivable that a smaller pipe or an umbilical replaces the power cable 2 or comes as an addition.

The arrangement 1 includes at least one strapping machine 6 which is so arranged that it is movable forward together with the power cable 2 and the pipeline 3 in order to perform the strapping operation in parallel with, or in concert with the advancement, and movable rearward relative to the power cable 2 and the pipeline 3 for preparation and repositioning to a next strapping operation. In this way the application of a strap 7, or straps, will take place intermittently during the continuous laying of the strapped pipe bundle 4.

The arrangement 1 also includes means 8 for continuous, motorized feeding or advancement of the respective pipes 3 and power cables 2 toward the strapping machine 6 and simultaneously provides for the further feeding along a stinger that brings the pipe bundle 4 out and into the sea.

The means 8 for continuous, motorized feeding of the respective power cables 2 and pipes 3 toward the strapping machine 6 will typically be in the form of a plurality of caterpillar tracks 9 acting directly against the surface of the pipe 3, alternatively also against the cable 2.

FIG. 2-7 show a more complicated arrangement 1 that also show a stinger bridge 11 onto which the cable bundle 4 is resting and guided along on its journey into the sea. In a common way the stinger bridge 11 can be elevated from or lowered to the sea by means of powerful working cylinders 11a. The cable bundle 4 enters the sea in one direction toward left hand side of the figure. Compared with FIG. 1, the arrangement now also includes means 12 which are able to give the power cable 2 a gentle S-form. This results in that the power cable 2 frills along the pipeline 3 (snaking) at the same time as it is firmly strapped as a so-called "piggyback" cable bundle 4.

In one embodiment, the means 12 making this gentle S-form (snaking) in each cable 2 can be in the form of a plurality of rollers 13 acting directly against the cable 2. See FIGS. 6 and 7 where this is more evident. The rollers 13 can be brought back and forth transversal to the longitudinal extension of the pipeline 3 and thus can impart amplitudinal excursions to the cable 2, as shown by means of a working cylinder 14. The rollers 13 is placed on bails 15 straddling over the cable 2, and the bails 15 are in turn fixed to the a cantilevered arm 16 secured to a rack 17. The rollers 13 act on and are thus gently sinus forming (snaking) the cable 2 in association with the strapping operation. The snaking means 12 is located downstream of the strapping machine 6. The arrow in FIG. 7 indicates the motions of the cantilevered arm 16 and thus the amplitude excursions of the rollers 13.

As it more clearly appears from FIG. 5-7, each strapping machine 6 includes a strap tensioning means 6b and an associated endless strap track 6a extending circumferentially around the cables 2 and pipes 3 and a distance apart therefrom. The strap track 6a is able to guide the strap 7 in an orbit around the pipe bundle 4 before the strap tensioning operation is conducted. See in particular FIG. 6 where the strap 7 is about to leave the strap track 6a. The base principle for such strapping machines is per se known. Typical choice of material for the strap 7 will be stainless materials like Inconel, but may also be of fiber reinforced composite material. As an example, without thereby being limiting, they can be in the form of metal strips having width of 30-40 mm, thickness 1 mm and rupture strength of 2000 kg.

Further the strapping machine 6 can be arranged on a chassis 10 which in turn is secured to the deck 5 of a vessel. The strapping machine 6 is arranged such that it is displaceable back and forth along guiding means 10a relative to the chassis 10. The unit is motorized and connected to control systems that provide for that the advancing speed of the strapping machine 6, while strapping takes place, is in harmony, or in concert, with the advancing speed of the pipeline 3.

The FIGS. 2-4 show various positions that the strapping machine 6 takes during its operation. This can be seen in respect of the snaking means 12 which is stationary in the arrangement 1 and relative to the vessel. FIG. 2 shows a situation where the strapping machine 6 is about to synchronize to the pipeline 3 for advancing therewith.

FIG. 3 shows a situation where the strapping machine 6 follows the pipeline 3 and strapping occurs. At the same time the snaking means 12 is operated and has just had its maximum excursion and is on its way to return against minimum excursion. See also FIG. 7 that shows approximately maximum excursion of the snaking means 12.

FIG. 4 shows a situation where the strapping machine 6 is just returned to its position of origin ready for another roundtrip as indicated in FIG. 2. The snaking means 12 has returned to its minimum excursion.

The invention claimed is:

1. An arrangement on board a vessel to be able to strap at least one cable to a pipeline during continuous and contemporary laying of a strapped pipe bundle into a sea, the arrangement comprising:
   at least one strapping machine arranged to be movable forward together with the at least one cable and the pipeline in order to perform a strapping operation in concert with a forward advancement of the at least one cable and the pipeline, and moveable rearwards relative to the at least one cable and the pipeline for repositioning to a next strapping operation such that the application of a strap or straps takes place intermittently under the continuous laying of the strapped pipe bundle;
   a continuous motorized advancement device configured to feed a cable bundle including the at least one cable and the pipeline towards the at least one strapping machine and further into the sea; and
   an S-forming device configured to shape the at least one cable that rests against the pipeline into an S-form.

2. The arrangement according to claim 1, wherein the S-forming device includes rollers, and a working cylinder acting on the rollers engaging the cable, said working cylinder being activated back and forth in amplitude excursions in order to S-form the cable in gentle sinus form.

3. The arrangement according to claim 2, wherein the S-forming device is stationary relative to the vessel and the advancing cable bundle.

4. The arrangement according to claim 2, further comprising guide rails, wherein the strapping machine is arranged on a chassis which in turn is attached to the vessel, and is moveable back and forth along the guide rails relative to the chassis.

5. The arrangement according to claim 2, wherein the arrangement is configured to strap a pipe bundle including at least one cable to a pipeline during continuous and contemporary laying of a strapped pipe bundle into a sea, and wherein each strapping machine includes a strap tensioning device and an associated endless strap track configured to extend circumferentially around the at least one cable and the pipeline and at a distance apart therefrom, which strap track is able to guide the strap in orbit around the pipe bundle before the strap tensioning operation is performed.

6. The arrangement according to claim 2, wherein the arrangement is configured to strap a pipe bundle including at least one cable to a pipeline during continuous and contemporary laying of a strapped pipe bundle into a sea, and wherein the continuous motorized advancement device comprises a number of caterpillar tracks configured to act directly against surfaces of the at least one cable and the pipeline.

7. The arrangement according to claim 1, wherein the S-forming device is stationary relative to the vessel.

8. The arrangement according to claim 7, further comprising guide rails, wherein the strapping machine is arranged on a chassis which in turn is attached to the vessel, and is moveable back and forth along the guide rails relative to the chassis.

9. The arrangement according to claim 7, wherein the arrangement is configured to strap a pipe bundle including at least one cable to a pipeline during continuous and contemporary laying of a strapped pipe bundle into a sea, and wherein each strapping machine includes a strap tensioning device and an associated endless strap track configured to extend circumferentially around the at least one cable and the pipeline and at a distance apart therefrom, which strap track is able to guide the strap in orbit around the pipe bundle before the strap tensioning operation is performed.

10. The arrangement according to claim 7, wherein the arrangement is configured to strap a pipe bundle including at least one cable to a pipeline during continuous and contemporary laying of a strapped pipe bundle into a sea, and wherein the continuous motorized advancement device comprises a number of caterpillar tracks configured to act directly against surfaces of the at least one cable and the pipeline.

11. The arrangement according to claim 1, further comprising guide rails, wherein the strapping machine is arranged on a chassis which in turn is attached to the vessel, and is moveable back and forth along the guide rails relative to the chassis.

12. The arrangement according to claim 11, wherein the arrangement is configured to strap a pipe bundle including at least one cable to a pipeline during continuous and contemporary laying of a strapped pipe bundle into a sea, and wherein each strapping machine includes a strap tensioning device and an associated endless strap track configured to extend circumferentially around the at least one cable and the pipeline and at a distance apart therefrom, which strap track is able to guide the strap in orbit around the pipe bundle before the strap tensioning operation is performed.

13. The arrangement according to claim 11, wherein the arrangement is configured to strap a pipe bundle including at least one cable to a pipeline during continuous and contemporary laying of a strapped pipe bundle into a sea, and wherein the continuous motorized advancement device comprises a number of caterpillar tracks configured to act directly against surfaces of the at least one cable and the pipeline.

14. The arrangement according to claim 1, wherein the arrangement is configured to strap a pipe bundle including at least one cable to a pipeline during continuous and contemporary laying of a strapped pipe bundle into a sea, and wherein each strapping machine includes a strap tensioning device and an associated endless strap track configured to extend circumferentially around the at least one cable and the pipeline and at a distance apart therefrom, which strap track is able to guide the strap in orbit around the pipe bundle before the strap tensioning operation is performed.

15. The arrangement according to claim 14, wherein the arrangement is configured to strap a pipe bundle including at least one cable to a pipeline during continuous and contemporary laying of a strapped pipe bundle into a sea, and wherein the continuous motorized advancement device comprises a number of caterpillar tracks configured to act directly against surfaces of the at least one cable and the pipeline.

16. The arrangement according to claim 1, wherein the arrangement is configured to strap a pipe bundle including at least one cable to a pipeline during continuous and contemporary laying of a strapped pipe bundle into a sea, and wherein the continuous motorized advancement device comprises a number of caterpillar tracks configured to act directly against surfaces of the at least one cable and the pipeline.

17. The arrangement according to claim 1, wherein the arrangement is configured to strap a pipe bundle including at least one cable to a pipeline during continuous and contemporary laying of a strapped pipe bundle into a sea, and wherein the S-forming device comprises a plurality of rollers configured to straddle over the at least one cable, and the plurality of rollers are configured to act directly on the at least one cable, move back and forth in a direction transverse to a longitudinal direction of the at least one cable, and shape the at least one cable into the S-form, and whereby the at least one cable frills along the pipeline while being firmly strapped with the pipeline.

18. A method to bundle by means of strapping a pipe bundle including at least one cable string to a pipeline to be continuously deployed into a sea from a pipelay vessel, the method comprising the steps of:

feeding or advancing said pipeline and each cable string in concert with and in contact with each other in a direction towards a strapping machine;

the strapping machine performing, at intervals, a strapping operation contemporary to that the strapping machine is moved in concert with the pipe bundle;

relocating the strapping machine relative to the pipe bundle for preparation to another strapping operation; and shaping the at least one cable string, at a location adjacent to the strapping machine, into an S-form by laterally impacting the at least one cable string, while the at least one cable string remains resting against the pipeline, subsequent to the strapping operation and further on when the bundle enters the sea and downwards to a seabed.

19. The method according to claim 18, wherein an interface between the pipeline and the at least one cable string is deformed for creation of natural saddle indentations in the strapping area.

20. The method according to claim 18, wherein the strapping operation takes place at intervals between 2 to 10 meters.

21. The method according to claim 18, wherein the strapping is performed with two strapping machines where each strap is placed between 50 and 500 mm apart when viewed in a longitudinal direction of the pipe bundle.

22. The method according to claim 18, wherein the strapping takes place at intervals of about 6 meters.

* * * * *